(12) United States Patent
Singla et al.

(10) Patent No.: US 9,106,681 B2
(45) Date of Patent: Aug. 11, 2015

(54) REPUTATION OF NETWORK ADDRESS

(71) Applicants: Anurag Singla, Sunnyvale, CA (US); Doron Keller, Sunnyvale, CA (US)

(72) Inventors: Anurag Singla, Sunnyvale, CA (US); Doron Keller, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 64 days.

(21) Appl. No.: 13/716,781

(22) Filed: Dec. 17, 2012

(65) Prior Publication Data

US 2014/0173723 A1  Jun. 19, 2014

(51) Int. Cl.
*H04L 29/06* (2006.01)
*G06F 21/55* (2013.01)

(52) U.S. Cl.
CPC .......... *H04L 63/1408* (2013.01); *G06F 21/552* (2013.01); *H04L 63/1425* (2013.01); *H04L 63/1441* (2013.01); *H04L 63/20* (2013.01)

(58) Field of Classification Search
CPC ............ H04L 63/1441; H04L 63/1408; H04L 63/145; H04L 63/1483; G06F 21/552
USPC ..................................................... 726/22–30
See application file for complete search history.

(56) References Cited

U.S. PATENT DOCUMENTS

| | | | |
|---|---|---|---|
| 7,472,422 B1 | 12/2008 | Agbabian | |
| 7,669,239 B2 | 2/2010 | Dickelman et al. | |
| 7,818,343 B1* | 10/2010 | Sekhar et al. | 707/781 |
| 7,877,493 B2* | 1/2011 | Quinlan | 709/229 |
| 8,370,407 B1* | 2/2013 | Devarajan et al. | 707/899 |
| 2003/0046545 A1* | 3/2003 | Merkle et al. | 713/176 |
| 2005/0010543 A1* | 1/2005 | Lukomnik et al. | 706/46 |
| 2006/0010492 A9* | 1/2006 | Heintz et al. | 726/23 |
| 2006/0031314 A1* | 2/2006 | Brahms et al. | 709/206 |
| 2006/0031938 A1 | 2/2006 | Choi | |
| 2006/0168024 A1* | 7/2006 | Mehr et al. | 709/206 |
| 2006/0206941 A1* | 9/2006 | Collins | 726/25 |
| 2007/0185864 A1* | 8/2007 | Budzik et al. | 707/5 |
| 2008/0114709 A1* | 5/2008 | Dixon et al. | 706/13 |
| 2008/0162592 A1 | 7/2008 | Huang et al. | |
| 2008/0229422 A1 | 9/2008 | Hudis et al. | |
| 2009/0300768 A1* | 12/2009 | Krishnamurthy et al. | 726/26 |
| 2011/0185436 A1* | 7/2011 | Koulinitch et al. | 726/28 |
| 2011/0296519 A1* | 12/2011 | Ide et al. | 726/13 |
| 2012/0210425 A1* | 8/2012 | Porras et al. | 726/22 |
| 2013/0041955 A1* | 2/2013 | Chasin et al. | 709/206 |
| 2013/0247201 A1* | 9/2013 | Alperovitch et al. | 726/24 |

OTHER PUBLICATIONS

Chuvakin, Anton; The Complete Guide to Log and Event Management; White Paper; Mar. 2010, Sponsored by Novell.

* cited by examiner

*Primary Examiner* — Harunur Rashid
*Assistant Examiner* — Sher Khan
(74) *Attorney, Agent, or Firm* — Hewlett-Packard Patent Department

(57) ABSTRACT

Example embodiments disclosed herein relate to determining a reputation of a network address. A long-term reputation of the network address is determined. A short-term reputation of the network address is determined based on the long-term reputation and trend information associated with the long-term reputation.

18 Claims, 5 Drawing Sheets

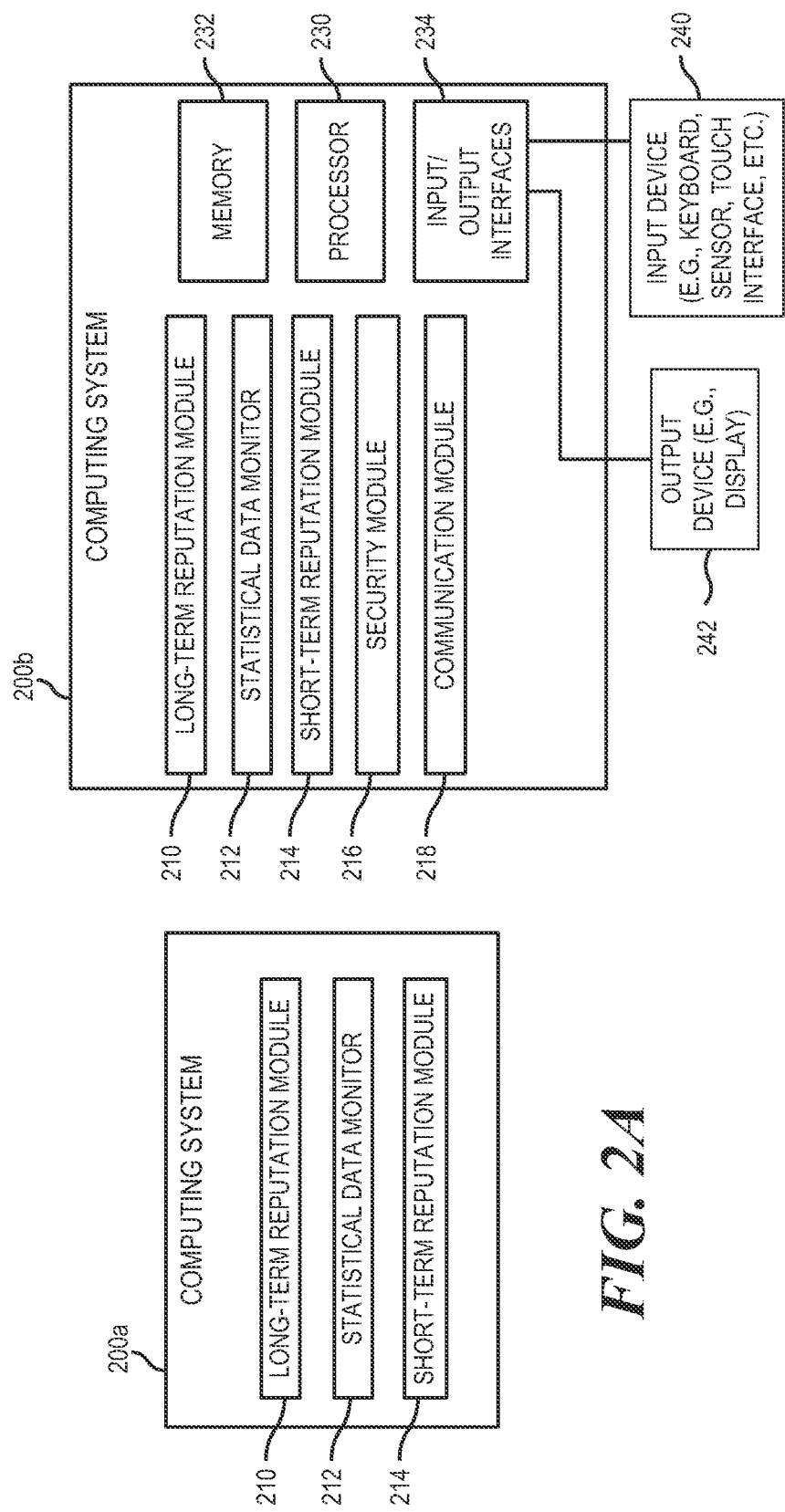

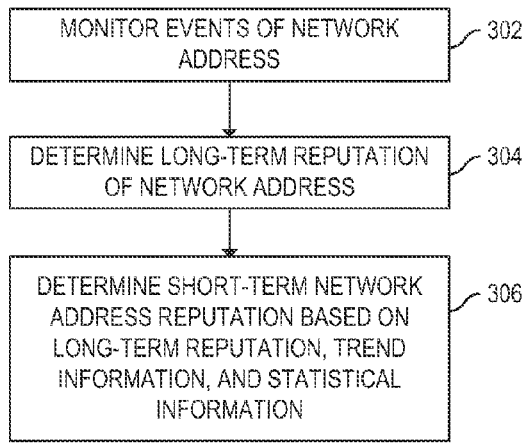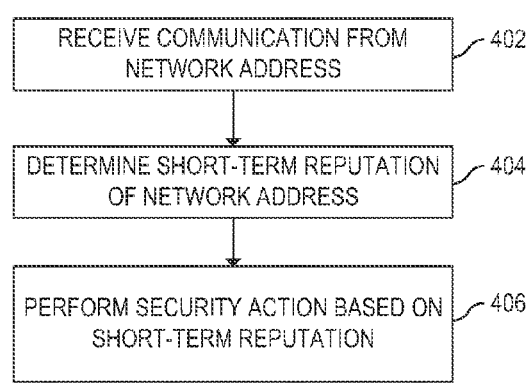
*FIG. 3*  *FIG. 4*

REPUTATION OF NETWORK ADDRESS

BACKGROUND

Security Information and Event Management (SIEM) technology provides real-time analysis of security alerts generated by network hardware and applications. SIEM technology can detect possible threats to a computing network. These possible threats can be determined from an analysis of security events.

BRIEF DESCRIPTION OF THE DRAWINGS

The following detailed description references the drawings, wherein:

FIGS. 2A and 2B are block diagrams of computing systems capable of determining a short-term reputation of a network address, according to various examples;

FIG. 3 is a flowchart of a method for determining a short-term reputation of a network address, according to one example;

FIG. 4 is a flowchart of a method for using a short-term reputation of a network address, according to one example;

DETAILED DESCRIPTION

Figure 1:
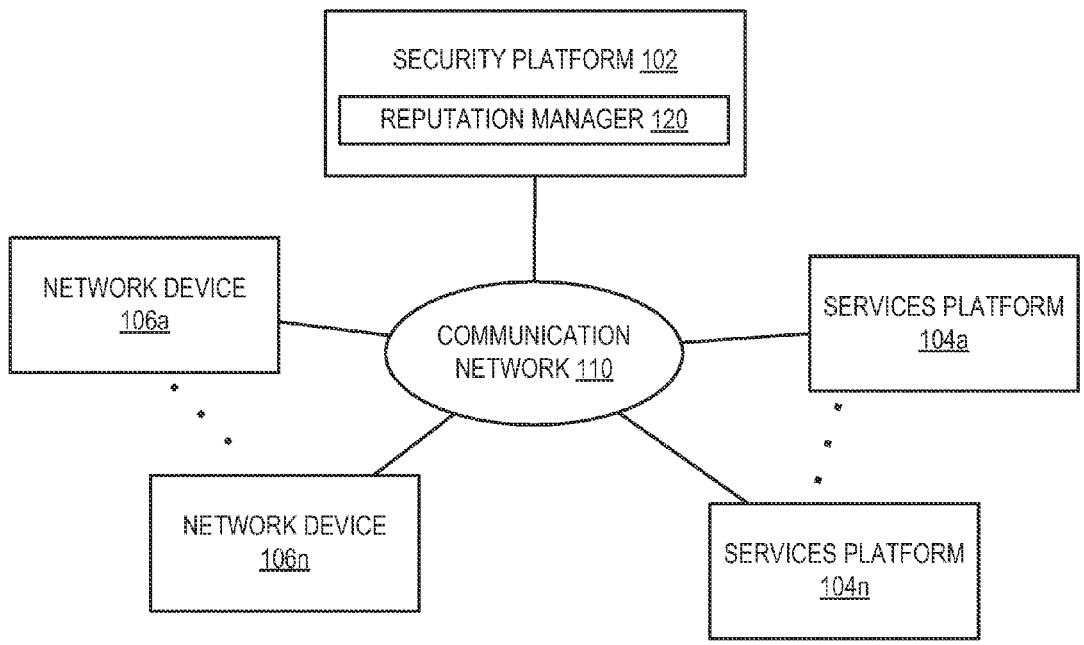
FIG. 1 is a block diagram of a system capable of determining a reputation of a network address, according to one example.

Security information/event management (SIM or SIEM) systems are generally concerned with collecting data from networks and networked devices that reflect network activity and/or operation of the devices and analyzing the data to enhance security. For example, data can be analyzed to identify an attack on the network or a networked device and determine which user or machine is responsible. If the attack is ongoing, a countermeasure can be performed to thwart the attack or mitigate the damage caused by the attack. The data that can be collected can originate in a message (e.g., an event, alert, alarm, etc.) or an entry in a log file, which is generated by a networked device. Example networked devices include firewalls, intrusion detection systems, servers, etc. In one example, each message or log file entry ("event") can be stored for future use. Stored events can be organized in a variety of ways.

There are numerous internet protocol (IP) address based devices on the Internet and/or other networks. Many of these devices may have malicious code executing. Traffic from any of the potentially malicious devices to an enterprise should be scrutinized for any malicious behavior. Also, the kind of attack pattern from these devices and the vulnerabilities that these devices can exploit can vary over a large range. SIEM technology can identify a large range or risks and exploits, and categorize the attack device(s) accordingly.

Reputation-based threat intelligence can be used to improve detection and mitigation of important threats that can be detected by a SIEM. Reputation-based security policies can be actively enforced and managed to help focus on those threats with the most risk. Web sites and/or devices known to have bad reputations can be segregated and treated differently than web sites and devices with good reputations. Benefits of using reputation include early detection of threats, prioritization of remediation efforts using reliable threat intelligence, customization for unique threat experiences, and prevention of exfiltration of intellectual property.

As such, example embodiments disclosed herein relate to determining a reputation for network addresses and/or network devices. These reputations can be used to determine a security function or action to use against possible malicious activity. Data monitors and trends can be used to categorize as well as score the threat gravity level of the devices (e.g., based on network address). This information can be translated to a reputation of the device and can further include categorization(s) of the attacker devices.

Rules can be used to monitor events. These rules can further utilize information from statistical data monitors. In certain examples, a data monitor can maintain additional information about network devices individually and/or as a group. Example additional information can include hourly counts, a hierarchy map, partial matching of rules, event and session reconciliation, system and system attribute monitoring, asset category counts, etc. Further, statistical data monitors can take the log and event information and/or the additional information to perform a statistical analysis, such as averaging, moving averages, standard deviation, kurtosis, etc. The statistics can be based on data within specified fields of the information collected and/or the number of events. Rules can access the information maintained by data monitors in real-time and utilize the information in rule logic.

As such, if an attack is determined to be coming in from a device, the attack can be categorized, the IP address recorded, and a reputation generated and/or updated based on the attack. In one example, an IP address with either no previous information can be initialized with a long-term reputation set at a predetermined value. In this example, the reputation is set at 50, but it should be understood that other values can be used. The value of the reputation can change when an attack, other malicious activity, etc. is determined to have come from the network address. For example, if malicious activity is found, the reputation can be incremented to 51. If another attack comes, it can be incremented again. Further, the amount it is incremented can vary based on a type of malicious activity or attack and/or how critical the target of the attack is. For example, a credit card or personal information database would be considered more critical than a free blog webpage.

Similarly, mitigating activity can be used to increase good reputation of a network address. This can be accomplished, for example, by installing recognized safety precautions (e.g., antivirus, firewall, etc.) that can report status information to the SIEM, by administrator approval, etc. In some examples, installation of an associated SIEM may be able to help improve the long-term reputation of a device or associated web address.

Moreover, the long-term reputation can be normalized. For example, the reputation can include feedback and/or be based on time. In one example, a function or process can be used to return the reputation of a network address to a predetermined value e.g., the initialization value). Further, other predetermined values can be used or be implemented if, for example, the network address hits a threshold. For example, if the network address starts with a reputation of 50 and crosses a threshold (e.g., goes over 70), the predetermined value may change from 50 to 60. In certain examples, an administrator of the network address may be asked to identify and mitigate any malicious behavior before the reputation normalization value is lowered.

Trend information of the reputation of network addresses can be kept. As such, the SIEM can determine whether the network address is becoming a problem and/or is becoming safer. This information can be used to help determine a short-term reputation of the network address. The short-term reputation can be used to determine an action to take in response to a communication by the network address. In certain examples, the short-term reputation can be based on the long-term reputation, trend information associated with the long-term reputation, and statistical information from statistical data monitors. In certain examples, the statistical information can be in real-time or near-real-time.

FIG. 1 is a block diagram of a system capable of determining a reputation of a network address, according to one example. The system 100 can include a security platform 102 that communicates with services platforms 104 and/or other network devices 106a-106n via a communication network 110. In certain examples, the security platform 102, services platforms 104a-104n, and/or the network devices 106a-106n are computing devices, such as servers, client computers, desktop computers, mobile computers, network devices, etc. The security platform 102, services platforms 104, and/or the network devices 106a-106n can be implemented via a processing element, memory, and/or other components. Further, the platforms and/or devices may be implemented using multiple devices and/or processors, for example, via distributed processing.

Network devices 106 can receive services from various services platforms 104a-104n. Services can vary based on application task and/or purpose. Examples of tasks include providing cloud services, point of interest services, web page services, web applications, web services, database services, etc. Further, network devices 106 can be servers, services platforms, client devices, or the like.

The security platform 102 may be used to provide security services to one or more services platforms 104, for example, as a SIEM. The security platform 102 can be behind a firewall with the respective services platforms 104 are at a different network location, or the like. In some examples, the security platform 102 may lay between the communication network 110 and the services platform 104, for example, in an implementation where the security platform 102 provides one or more intrusion detection services.

The network device 106 can request services from the services platforms 104. Logs, events, and other information associated with the services platform 104 can be monitored by the security platform 102. A reputation manager 120 can determine long-term and/or short-term reputations for the network devices 106 based on the monitored information and/or other information (e.g., administrator input, rules, etc.). As noted above, the reputation manager 120 can determine a long-term reputation based on this information. The short-term reputation of a particular network device 106 and/or network address can be based on the long-term reputation, one or more data monitors associated with services platforms 104 and/or the security platform 102, and trend information associated with how the network address and/or network device 106 has been acting.

The reputations generated by the reputation manager 120 can be used by the services platform 104 and/or security platform to determine how to respond to a network device 106 and/or network address. For example, a bad reputation can be associated with a propensity to perform malicious activity. As such, the network address or network device 106 can be banned, sandboxed, etc. by one or more security mechanisms used to protect the services platform 104. In some examples, a trend of the network address becoming more of a problem can be used to detect threats early so the threats can be mitigated.

With these approaches, a large range of attacks for SIEM correlation can be identified. Additional tests may be run once a network address has been identified. Further, a deeper and wider categorization of attackers based on rules and data monitors can be performed. Moreover, an approach for assessment of attack frequency and gravity based on SIEM trends can be determined. The sharing of reputation information from one security platform 102 to other security platforms (e.g., SIEM devices) can help detect network addresses and/or devices that may be used for an attack on one services platform to prevent the attack or a similar attack on another services platform. For example, a network device 106a associated with a first network address may attack a first services platform 104a. During the attack, the reputation of the network address may become bad. The bad reputation can then be used to help diagnose an attack from the network address on another services platform 104n.

As noted above, SIEM systems can be used to detect system anomalies. SIEM system scan detect such anomalies not only by matching known signatures, but also by correlating security information and discovering unknown patterns of traces in the system. As such, SIEM systems may collect data about networks and network devices. This data may be collected in the form of events. An event may be any activity that can be monitored and analyzed. Data captured for an event can be referred to as event data. Analysis of captured event data may be performed to determine if the event is associated with a threat or some other condition. Examples of activities associated with events may include logins, logouts, sending data over a network, sending emails, accessing applications, reading or writing data, port scanning, installing software, etc. Event data may be collected from messages, log file entries, which is generated by a network device, or from other sources. This event data may be processed and may be analyzed by statistical data monitors to provide statistical information about network addresses.

In some examples, a network address can represent one or more of the network devices 106a-106n. The network address can be associated with a good reputation or a bad reputation. In some examples, one or more of the network devices associated with the network address can be considered associated with the reputation. With this approach, if one device behind a firewall associated with the network address is malicious, it can bring attention to each of the devices behind the firewall.

Moreover, in some examples, if the reputation of a network address is considered bad, rules for data mining that particular network address can be changed to be looser to pick up additional activity. This can be based on the determination that more scrutiny should be provided to bad actors to search for additional bad acts.

Further, as the short-term reputation of the network address becomes had at one security platform, the reputation can be disseminated to other security platforms. As such, activity by the network address can be more intensely scrutinized. For example, additional resources can be allocated to monitoring the network address more closely (e.g., by running algorithms for pattern detection and/or for detection of certain malicious activity that would not normally be utilized).

In some examples, the network devices 106 can be associated with a website. A security platform can be associated with providing reputation information to SIEM devices. As such, the website can be blocked, warned or otherwise dealt with at locations protected by the SIEM devices when the reputation of the website is bad. Moreover, in certain examples, the network address can be associated with a user computer, an enterprise entity (e.g., a corporate network), or the like. In some examples, the SIEM devices are protecting an entity such as a corporation. Employees on the network may be prohibited from visiting websites that may be considered bad actors (e.g., if the websites are associated with phishing or other malicious activity).

The communication network 110 can use wired communications, wireless communications, or combinations thereof. Further, the communication network 110 can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network 110 can be in the form of a direct network link between devices. Various communications structures and infrastructure can be utilized to implement the communication network(s).

By way of example, the security platform 102, services platforms 104, and/or network devices 106 communicate with each other and other components with access to the communication network 110 via a communication protocol or multiple protocols. A protocol can be a set of rules that defines how nodes of the communication network 110 interact with other nodes. Further, communications between network nodes can be implemented by exchanging discrete packets of data or sending messages. Packets can include header information associated with a protocol (e.g., information on the location of the network node(s) to contact) as well as payload information.

FIGS. 2A and 2B are block diagrams of computing systems capable of determining a short-term reputation of a network address, according to various examples. Computing systems 200a, 200b include components that can be utilized to determine a reputation of a network address. The respective computing systems 200a, 200b may be a notebook computer, a desktop computer, a tablet computing device, a wireless device, a server, a workstation, or any other computing device that can determine a reputation of a network address. The computing system 200a can include a long-term reputation module 210, one or more statistical data monitor 212, and a short-term reputation module 214. The computing system 200b can further include a security module 216, communication module 218, memory 232, a processor 230, input/output interfaces 234, and/or be associated with an output device 242 and/or input device 240. Moreover, the computing system 200 can be implemented over multiple computing devices (e.g., servers).

The long-term reputation module 210 can be used to associate a reputation with a network address. As such, the long-term reputation module 210 can determine a long-term reputation of the network address. As noted above, the long-term reputation can be initially set at a base value. When the network address is associated with a malicious action, the long-term reputation is modified (e.g., to be considered more bad). Further, the long-term reputation can be normalized based on time. Moreover, the long-term reputation can be mitigated. The long-term reputation can be a score. The score can be set at the base value and modified on the actions of the network address. Moreover, the score can correspond to a threat gravity level of the network address. In one example, the threat gravity level is a function of the likelihood the network address is malicious as well as how malicious the network address is or can be. As such, the score can be changed based on the maliciousness of the activity. For example, the score can be incremented by 1 for a lightly malicious activity, but by 5 for a more malicious activity. Various scales can be used.

At least one statistical data monitor 212 can be used to monitor one or more events associated with the network address to generate statistical information. In one example, the statistical information is based on the statistical data monitor 212 of the computing system 200. In another example, statistical information can further be based on a statistical data monitor on another computing device.

Statistical data monitors evaluate real-time security events and can compute various statistical values on one or more event fields (e.g., count, sum, average, standard deviation, etc.). In one example, a statistical data monitor can count the number of attack events per network address (e.g., IP address). In another example, a statistical data monitor can sum the numerical priority value of attack events per network address (e.g., high priority events will influence the short-term reputation more than low priority events). In a further example, a statistical data monitor can sum the numerical priority value multiplied by asset criticality value of the target of the attack. As such, reputations can be affected by the importance of the target of an attack, the criticality of the attack, and the frequency of attack(s).

A short-term reputation module 214 can be used to determine a short-term reputation of the network address based on the long-term reputation, trend information associated with the long-term reputation, and the statistical information. The trend information can include a function of multiple historical points associated with the long-term reputation. In one example, the trend information is a slope or other fit associated with the multiple historical points (e.g., slope of the line of best fit, another value that is a function of the multiple historical points, etc.). This lets us know if the network address is beginning an attack pattern (and thus trending towards a more bad reputation). In converse, if the long-term reputation is bad, but is trending towards a more good reputation, it could indicate that the network address was previously associated with malicious activity (e.g., because a device associated with the network address was infected with a malicious program such as a virus), but is no longer associated with the activity or is associated with less worrisome activity. Moreover, the multiple historical points can be based on a normalized long-term reputation. That can mean, for example, that the historical points of the long-term reputation are modified to be normalized (e.g., return towards a particular score or scores based on circumstances).

The short-term reputation can thus be a function or other calculation of the long-term reputation, the statistical information associated with the statistical data monitor(s), and the trend information. In one example, the information can be weighted based on the trend information. For example, the score can be more bad if the trend is moving towards a bad reputation or less bad if the trend is moving towards a more neutral value. In another example, the short-term reputation can further be weighted more towards more recent historical points or information (e.g., based on the statistical information).

The security module 216 can perform a security action based on the short-term reputation. In some examples, the security action can be to spread the reputation information to other SIEM devices. In other examples, the security action can include restricting access to devices associated with the network address, sandboxing access, or providing other mitigating action.

In some examples, the communication module 218 can receive a request from a device associated with the network address. The security action can be taken based on the request (e.g., rejecting the request, sending a warning, etc.). In some examples, the security module 216 can act as a protector for a services platform to intercept the request.

A processor 230, such as a central processing unit (CPU) or a microprocessor suitable for retrieval and execution of instructions and/or electronic circuits can be configured to perform the functionality of any of the modules 210, 212, 214, 216, 218 described herein. In certain scenarios, instructions and/or other information, such as reputation information, data monitor information, etc., can be included in memory 232 or other memory. Input/output interfaces 234 may additionally be provided by the computing system 200b. For example, input devices 240, such as a keyboard, a sensor, a touch interface, a mouse, a microphone, etc. can be utilized to receive input from an environment surrounding the computing system 200b. Further, an output device 242, such as a display, can be utilized to present information to users. Examples of output devices include speakers, display devices, amplifiers, etc. Moreover, in certain embodiments, some components can be utilized to implement functionality of other components described herein.

Each of the modifies 210, 212, 214, 216, 218 may include, for example, hardware devices including electronic circuitry for implementing the functionality described herein. In addition or as an alternative, each module 210, 212, 214, 216, 218 may be implemented as a series of instructions encoded on a machine-readable storage medium of computing system 200 and executable by processor 230. It should be noted that, in some embodiments, some modules are implemented as hardware devices, while other modules are implemented as executable instructions.

FIG. 3 is a flowchart of a method for determining a short-term reputation of a network address, according to one example. Although execution of method 300 is described below with reference to computing system 200, other suitable components for execution of method 300 can be utilized (e.g., security platform 102). Additionally, the components for executing the method 300 may be spread among multiple devices. Method 300 may be implemented in the form of executable instructions stored on a machine-readable storage medium, such as storage medium 620, and/or in the form of electronic circuitry.

At 302, one or more events associated with a network address are monitored to generate event information. The events can be monitored at a security platform such as an SIEM. Further, the event information can include one or more fields, such as associated network addresses, type of event, time of event, importance of event, target of event, source of event, etc. At 304, a long-term reputation of the network address is determined based on the event information. The determination of the long-term reputation is further detailed in FIG. 5.

At 306, a short-term reputation of the network address is determined based on the long-term reputation, trend information associated with the long-term reputation, and a recent portion of the event information. The trend information can include a function of multiple historical points associated with the long-term reputation. The historical points can be based on one or more periods or other times. For example, a historical point can be recorded daily, hourly, every 20 minutes, weekly, etc. In some examples, the history can be retained until a certain time threshold. For example, the history can be retained for a year. In other examples, historical information can be retained and used indefinitely.

In one example, the recent portion of the event information can be live information, real-time information, or information within a particular time (e.g., within 1 minute, within 1 hour, etc.). In certain examples, the recent portion of the event information can be determined using statistical data monitors on the event information. Thus, the recent information can be processed.

In some examples, the long-term reputation can be updated based on the short-term reputation. As such, in some examples, the one or more of the multiple historical points can be based on a short-term reputation at that time. As noted above, the reputations can be treated like scores.

FIG. 4 is a flowchart of a method for using a short-term reputation of a network address, according to one example. Although execution of method 400 is described below with reference to computing system 200, other suitable components for execution of method 400 can be utilized (e.g., security platform 102). Additionally, the components for executing the method 400 may be spread among multiple devices. Method 400 may be implemented in the form of executable instructions stored on a machine-readable storage medium, such as storage medium 620, and/or in the form of electronic circuitry.

At 402, a computing device associated with the computing system 200 receives a communication such as a request from a network address. The computing device can be part of the computing system 200 or be protected by the computing system 200 as a security platform 102.

A security module 216 of the computing system 200 can determine a short-term reputation of the network address at 404. In one example, the security module 216 determines the short-term reputation by receiving it from the short-term reputation module 214 or a short-term reputation module of another computing system.

In some examples, the reputation can be categorized based on the score. In one example, the reputation can be considered good if it is within a first range, neutral if it is within a second range, and bad if it is within a third range. The granularity on the reputations can be coarser or finer based on implementation.

At 406, the security module 216 performs a security action based on the short-term reputation. In one example, if the short-term reputation is considered a good reputation, the security action can be favorable, for example, nothing can be done to the communication and communications can proceed normally. In another example, if the short-term reputation is considered neutral, nothing may be done or further analysis may be taken. In a further example, if the reputation can be considered bad, additional analysis may be taken before the communication is allowed to proceed, the communication can be blocked, etc. In one example, if the reputation is neutral or bad, some communications from the network address may be allowed (e.g., communications to non-critical systems of a services platform) while other communications may be blocked (e.g., communications to important systems of a services platform such as billing). As such, if the target of a communication is at a more or less critical system, a different reputation level can be used for a network address to be able to communicate with it.

Figure 5:
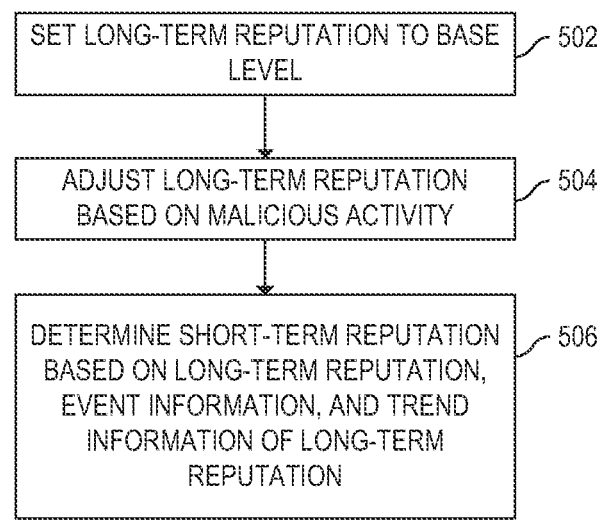
FIG. 5 is a flowchart of a method for determining a short-term reputation of a network address, according to one example.

FIG. 5 is a flowchart of a method for determining a short-term reputation of a network address, according to one example. Although execution of method 500 is described below with reference to computing system 200, other suitable components for execution of method 500 can be utilized (e.g., security platform 102). Additionally, the components for executing the method 500 may be spread among multiple devices. Method 500 may be implemented in the form of executable instructions stored on a machine-readable storage medium, such as storage medium 620, and/or in the form of electronic circuitry.

At 502, an initial long-term reputation can be determined for a network address. The initial long-term reputation can be initialized at a base level or value when the network address first communicates with a services platform and/or for another reason (e.g., based on reputation information at one or more SIEMs). The base level can be set at an arbitrary score, a score that can be considered neutral, or the like as noted above.

At 504, the long-term reputation can be adjusted based on malicious activity. As noted above, when the network address is associated with a malicious action, the long-term reputation can be modified negatively. Further, when the network address is associated with a time duration or period without malicious activity, the long-term reputation is modified positively. This can be based on a normalization process or function. The determination of malicious activity and/or malicious actions can be based on event information.

At 506, a short-term reputation can be determined based on the long-term reputation, event information, and trend information of the long-term reputation. As noted above, the trend information allows the computing system 200 to predict a likelihood of whether an attack may be coming and treat the network address accordingly. In some examples, the short-term reputation can be based on data monitors of the event information as well as is a function of the long-term reputation and trend information.

Figure 6:
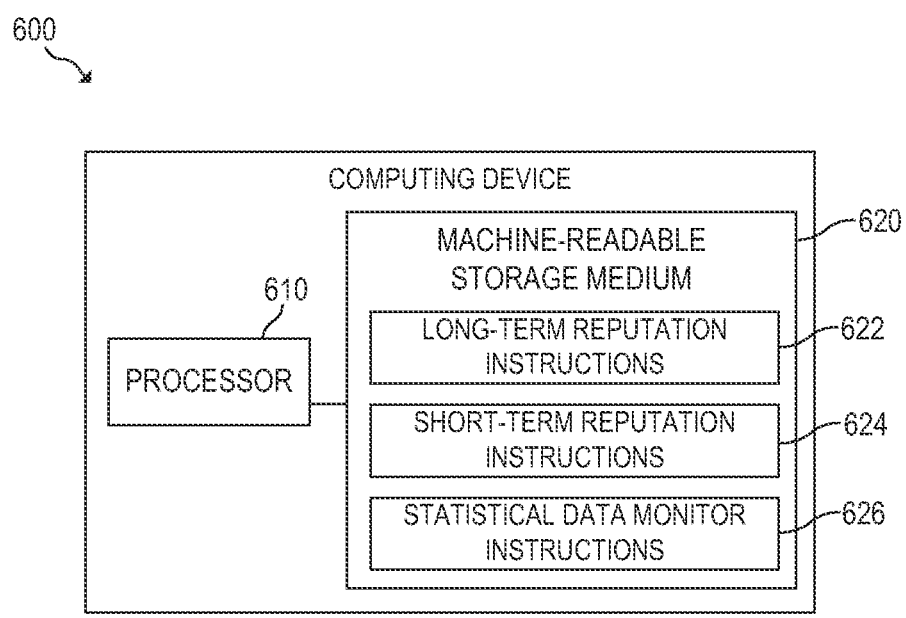
FIG. 6 is a block diagram of a computing device for determining a short-term reputation of a network address, according to one example.

FIG. 6 is a block diagram of a computing device for determining a short-term reputation of a network address, according to one example. The computing device 600 includes, for example, a processor 610, and a machine-readable storage medium 620 including instructions 622, 624, 626 for determining a short-term reputation of a network address. Computing device 600 may be, for example, a notebook computer, a slate computing device, a portable reading device, a wireless email device, a mobile phone, or any other computing device. The machine-readable storage medium 620 can include long-term reputation instructions 622, short-term reputation instructions, as well as statistical data monitor instructions 626.

Processor 610 may be, at least one central processing unit (CPU), at least one semiconductor-based microprocessor, at least one graphics processing unit (GPU), other hardware devices suitable for retrieval and execution of instructions stored in machine-readable storage medium 620, or combinations thereof. For example, the processor 610 may include multiple cores on a chip, include multiple cores across multiple chips, multiple cores across multiple devices (e.g., if the computing device 600 includes multiple node devices), or combinations thereof. Processor 610 may fetch, decode, and execute instructions 622, 624, 626 to implement methods 300, 400, 500. As an alternative or in addition to retrieving and executing instructions, processor 610 may include at least one integrated circuit (IC), other control logic, other electronic circuits, or combinations thereof that include a number of electronic components for performing the functionality of instructions 622, 624, 626.

Machine-readable storage medium 620 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 620 may be encoded with a series of executable instructions for determining and using a short-term reputation of a network address for security management.

Statistical data monitor instructions 626 can be executed by the processor 610 to generate statistical information. The statistical information can be based on event information associated with one or more events. Examples of statistical monitors include a monitor to count the number of attack events per IP address, a monitor to sum the numerical priority value of attack events per IP address (e.g., high priority events can influence the value more than low priority events), a monitor for summing the numerical priority value multiplied by an asset criticality value of a target of the attack. In some examples, an asset can be a part of a system, for example, a part of a services platform. Examples of assets may include: a search engine, an intellectual property database, a personnel database, a credit card database, new pages for public information, etc. A personnel database or credit card database may be considered more critical than a web page for public information.

Long-term reputation instructions 622 can be executed by the processor 610 to determine long-term reputation score for a network address based on the statistical information. Scores can be kept for various network addresses. Previous statistical information can also be used to determine the long-term reputation score as detailed above. The score can be based on the frequency and gravity of attacks from a network address, a weight on the criticality of the target of such attacks, as well as a reputation history.

Moreover, the long-term reputation can be used to determine a short-term reputation of the network address. Short-term reputation instructions 624 can be executed to determine the short-term reputation. As noted above, the short-term reputation can be based on the long-term reputation, trend information associated with the long-term reputation, and a portion of the statistical information. The trend information can include a function of multiple historical points associated with the long-term reputation. Further, the historical points can be short-term reputations at particular times and/or be based on a different scale. In some examples, the trend information can be a slope associated with the historical points.

The long-term reputation and short-term reputation scores can be performed for multiple network addresses. Further, the scores can be disseminated to multiple SIEMs. As such, SIEMs can use the short-term reputation scores in dealing with communications from the network addresses.

In one example, the computing device 600 can act as an SIEM and receive a request from a device or computing device associated with a network address. The computing device 600 can perform a security action based on the short-term reputation associated with that network address.

What is claimed is:

1. A computing system comprising:
   at least one hardware processor; and
   at least one application executable on the at least one hardware processor to:
   monitor, during a first time period, events associated with a network address to obtain event information;
   determine a first reputation score of the network address based on the event information, wherein the first reputation score is associated with the first time period; and
   determine a second reputation score of the network address based on the first reputation score, trend information associated with the first reputation score, and a portion of the event information corresponding to a second time period, wherein the second reputation score is associated with the second time period, and wherein the second time period is a portion of the first time period, wherein the trend information includes a slope associated with multiple historical points, wherein the multiple historical points are associated with the first reputation score.

2. The computing system of claim 1, wherein the at least one application is further to perform a security action based on the second reputation score.

3. The computing system of claim 1, wherein the at least one application is further to receive a request from a device associated with the network address, wherein the security action is taken based on request.

4. The computing system of claim 1,
wherein the first reputation score is initially set at a base value, wherein, when the network address is associated with a malicious action, the first reputation score is modified, and wherein the first reputation score is normalized based on time.

5. The computing system of claim 4, wherein the multiple historical points are based on the normalized first reputation score.

6. The computing system of claim 4, wherein the first reputation score is associated with a likelihood that the network address is malicious.

7. The computing system of claim 1, wherein the event information comprises statistical values associated with the events.

8. A non-transitory machine-readable storage medium storing instructions that, if executed by at least one processor of a device, cause the device to:
monitor, during a first time period, one or more events associated with a network address to generate event information;
determine a first reputation score of the network address based on the event information, wherein the first reputation score is associated with the first time period; and
determine a second reputation score of the network address based on the first reputation score, trend information associated with the first reputation score, and a recent portion of the event information corresponding to a second time period, wherein the trend information includes a slope associated with multiple historical points, wherein the multiple historical points are associated with the first reputation score, wherein the second reputation score is associated with the second time period, and wherein the second time period is a portion of the first time period.

9. The non-transitory machine-readable storage medium of claim 8, further comprising instructions that, if executed by the at least one processor, cause the device to:
receive a request from a computing device associated with the network address; and
perform a security action based on the second reputation score.

10. The non-transitory machine-readable storage medium of claim 8, further comprising instructions that, if executed by the at least one processor, cause the device to:
initially set the first reputation score at a base value, when the network address is associated with a malicious action, modify the first reputation score negatively, and normalize the first reputation score based on time.

11. The non-transitory machine-readable storage medium of claim 8, wherein the first reputation score is associated with a likelihood that the network address is malicious.

12. The non-transitory machine-readable storage medium of claim 8, wherein the event information comprises one or more statistical values associated with the one or more events.

13. The non-transitory machine-readable storage medium of claim 8, wherein the second time period is less than one minute.

14. A method comprising:
monitoring, during a first time period, one or more events associated with a network address to generate event information;
determining a first reputation score of the network address based on the event information, wherein the first reputation score is associated with a first time period; and
determining, at a processor, a second reputation score of the network address based on the first reputation score, trend information associated with the first reputation score, and a recent portion of the event information corresponding to a second time period, wherein the second reputation score is associated with the second time period, wherein the second time period is a portion of the first time period, wherein the trend information includes a slope associated with multiple historical points, wherein the multiple historical points are associated with the first reputation score; and updating the first reputation score based on the second reputation score.

15. The method of claim 14, further comprising:
initially set the first reputation score at a base value, when the network address is associated with a malicious action, modifying the first reputation score negatively, when the network address is associated with a third time period without malicious activity, modifying the first reputation score positively.

16. The method of claim 15, wherein modifying the first reputation score negatively is based on a priority of the malicious action.

17. The method of claim 14, further comprising:
performing a security function based on the second reputation score.

18. The method of claim 14, wherein the event information comprises one or more statistical values associated with the one or more events.

* * * * *